United States Patent [19]
Sellstedt et al.

[11] 3,880,877
[45] Apr. 29, 1975

[54] PROCESS FOR THE PREPARATION OF 6-ARYL-4H-S-TRIAZOLO(4,3-A)(1,4)BENZODIAZEPINES

[75] Inventors: John H. Sellstedt, King of Prussia; Daniel M. Teller, Devon, both of Pa.

[73] Assignee: American Home Products Corporation, New York, N.Y.

[22] Filed: Nov. 3, 1972

[21] Appl. No.: 303,668

[52] U.S. Cl.... 260/308 R; 260/296 T; 260/256.4 R; 260/999
[51] Int. Cl............................................ C07d 99/02
[58] Field of Search................................ 260/308 R

[56] References Cited
UNITED STATES PATENTS
3,767,660  10/1973  Hester................................. 260/308

*Primary Examiner*—Henry R. Jiles
*Assistant Examiner*—Robert T. Bond
*Attorney, Agent, or Firm*—Royal E. Bright

[57] ABSTRACT

A process for the preparation of 6-aryl-4H-s-triazolo[4,3-*a*][1,4]benzodiazepines from 2-halo-5-aryl-3H-1,4-benzodiazepines, and tetrazoles. The products are known CNS depressants with low toxicity.

1 Claim, No Drawings

PROCESS FOR THE PREPARATION OF 6-ARYL-4H-S-TRIAZOLO(4,3-A)(1,4)BENZODIAZEPINES

BACKGROUND OF THE INVENTION

6-Phenyl-4H-s-triazolo[4,3-a][1,4]benzodiazepines have previously been reported by Hester, et al, in The Journal of Medicinal Chemistry, Vol. 14, p. 1078, (1971), as being prepared from 1,3-dihydro-5-phenyl-2H-1,4-benzodiazepine-2-thiones and carboxylic acid hydrazides.

The present invention provides an alternative synthesis for 6-aryl-4H-s-triazolo[4,3-a][1,4]benzodiazepines.

SUMMARY OF THE INVENTION

The invention sought to be patented in its principal process aspect resides in the concept of a process for the preparation of 6-aryl-4H-s-triazolo[4,3-a][1,4]benzodiazepine of the formula:

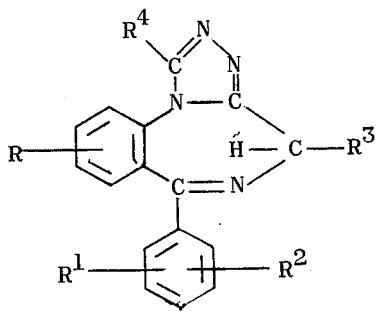

wherein R is hydrogen, lower alkyl, lower alkoxy, phenyl, lower alkoxyphenyl, phenyl(lower)alkyl, heteroaryl, halo, trifluoromethyl, nitro, di(lower)alkylamino, carbalkoxy, lower alkyl thio, lower alkyl sulfonyl, lower alkyl sulphinyl, or cyano; $R^1$ is hydrogen, lower alkyl, lower alkoxy, phenyl, lower alkoxyphenyl, phenyl(lower)alkyl, heteroaryl, halo, trifluoromethyl, nitro, di(lower)alkylamino, carbalkoxy, lower alkyl thio, lower alkyl sulfonyl, lower alkyl sulphinyl, or cyano; $R^2$ is hydrogen, lower alkyl, lower alkoxy, phenyl, lower alkoxyphenyl, phenyl(lower)alkyl, heteroaryl, halo, trifluoromethyl, nitro, di(lower)alkylamino, carbalkoxy, lower alkyl thio, lower alkyl sulfonyl, lower alkyl sulphinyl, or cyano, with the proviso that $R^1$ and $R^2$ are not adjacent trifluoromethyl; $R^3$ is hydrogen, lower alkyl, lower alkoxy, lower acyloxy, or halo; $R^4$ is hydrogen, lower alkyl, lower alkoxy, lower alkoxyphenyl, heteroaryl, phenyl(lower)alkyl, di(lower)alkylamino, carbalkoxy, or trifluoromethyl; which comprises warming in the presence of a hydrogen halide absorber, a 2-halo-5-aryl-3H-1,4-benzodiazepine of the formula:

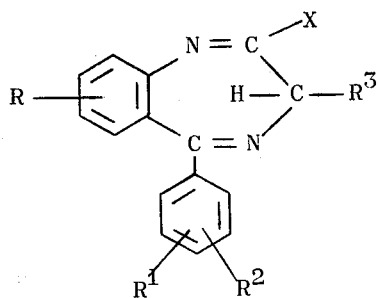

wherein R, $R^1$, $R^2$ and $R^3$ are as defined hereinabove, and X is halo with a tetrazole of the formula:

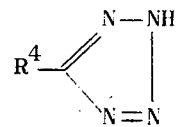

wherein $R^4$ is as defined hereinabove.

The tangible embodiments produced by the principal process aspect of the invention possess the inherent general physical properties of being crystalline solids, being substantially insoluble in water, and generally soluble in such common organic solvents as chloroform, dichloromethane, acetone, ethyl acetate and the like.

Examination of the product produced by the aforesaid process reveals, upon infrared and nuclear magnetic resonance spectrographic analysis, spectral data supporting the molecular structure hereinbefore set forth.

The tangible embodiments produced by the principle process aspect of the invention possess the inherent applied use characteristics of exerting CNS depressant activity while having low toxicity in experimental animals as evidenced by pharmacological evaluation according to standard test procedures.

The invention sought to be patented in a subgeneric process aspect is described as residing in the concept of a process for the preparation of 6-aryl-4H-s-triazolo[4,3-a][1,4]benzodiazepines of the formula:

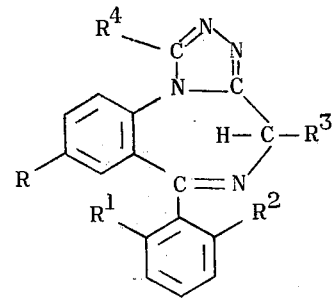

wherein R is hydrogen, halo, trifluoromethyl, nitro, or thiomethyl; $R^1$ is hydrogen, or halo; $R^2$ is hydrogen or halo; $R^3$ is hydrogen, lower alkyl, lower alkoxy, lower acyloxy, or halo; and $R^4$ is hydrogen, lower alkyl, or lower alkoxyphenyl; which comprises warming, in the presence of a hydrogen halide acceptor, a 2-halo-5-aryl-3H-1,4-benzodiazepine of the formula:

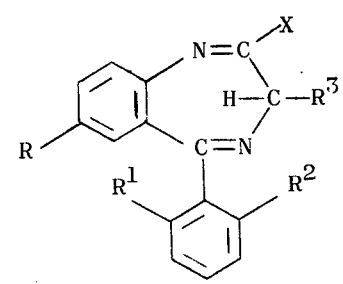

wherein R, R¹, R², and R³ are as described immediately hereinabove, and X is halo; with a tetrazole of the formula:

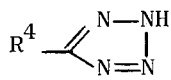

wherein R⁴ is as defined immediately hereinabove.

DESCRIPTION OF THE PREFERRED EMBODIMENT

As shown in Figure A, warming 5-methyl tetrazole (II) and 2,7-dichloro-5-(o-chlorophenyl)-3-methoxy-3H-1,4-benzodiazepine (I) in pyridine produces 8-chloro-6-(o-chlorophenyl)-4-methoxy-1-methyl-4H-s-triazolo[4,3-a][1,4]benzodiazepine (III). Isolation of the product (III) is accomplished by conventional means.

be necessary to initiate and maintain reaction. The exact temperature is not particularly critical and a range of about 80° to about 180° is suitable. Normally for convenience the reaction is conducted at the reflux temperature of the solvent employed. The time required for the reaction is not critical but normally nitrogen evolution during the course of the reaction will be observed, and continued heating for a few minutes after this evolution ceases will be sufficient.

While the process has been specifically illustrated with reference to figure A which describes the preparation of 8-chloro-7-(o-chlorophenyl)-4-methoxy-1-methyl-4H-s-triazolo[4,3-a][1,4]benzodiazepine, it will be obvious to the skilled organic chemist to substitute any of the various substituted starting materials, and obtain the various 6-aryl-4H-s-triazolo[4,3-a][1,4]benzodiazepines contemplated to be prepared by the invention.

Starting materials for the practice of the invention, namely the aforementioned 2-halo-5-aryl-3H-1,4-

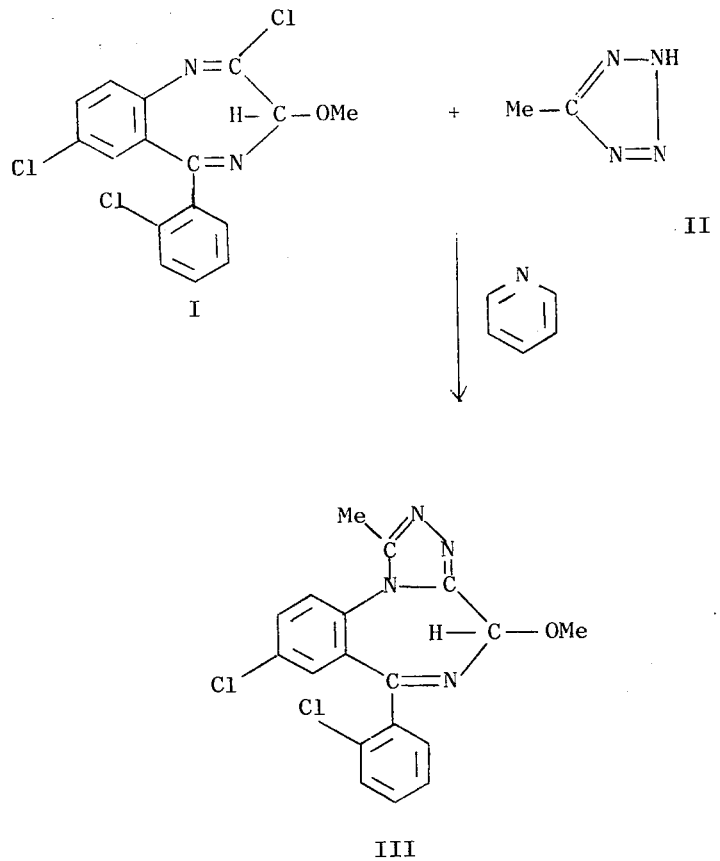

Figure A

In addition to pyridine, the reaction solvent and hydrogen halide absorber described, many other suitable single or combination solvents and hydrogen halide absorbers will occur to the skilled organic chemist. Among these will be such combinations as triethylamine or pyridine in benzene or toluene; pyridine or triethylamine in dimethyl formamide; and triethylamine. The skilled organic chemist will recognize that warming the reaction mixture above room temperature will benzodiazepines may be prepared by treatment of the corresponding 5-aryl-3H-1,4-benzodiazepine-2-ones with a halogenating agent as described in the copending Sellstedt application Ser. No. 293,701 filed September 29, 1972. The preparation of 5-aryl-3H-1,4-benzodiazepin-2-ones is described in the article "The Chemistry of Benzodiazepines" by Giles A. Archer and Leo H. Sternbach in Chemical Reviews, Volume 68, page 747 (1968), and the references cited therein. The other necessary starting materials for the practice of the invention namely the 5-substituted tetrazoles are compounds either commercially available or obtainable by synthetic methods well-known in the chemical literature.

6-aryl-4H-s-triazolo[4,3-a][1,4]benzodiazepines, the tangible embodiments produced by the present invention are useful as CNS depressant agents as reported by Hester, et al., in The Journal of Medicinal Chemistry, Volume 14, page 1073, (1971).

As used herein the term "lower alkyl" means a saturated hydrocarbon radical including the straight and branched chain radicals of from one to six carbon atoms, among which are for the purposes of illustration, but without limiting the generality of the foregoing, methyl, ethyl and i-butyl. The term "heteroaryl" means an aromatic heterocyclyl radical containing from three to five carbon atoms, and one or more atoms selected from the group nitrogen, oxygen, and sulfur, among which are for the purposes of illustration, but without limiting the generality of the foregoing, 2-pyridyl, and 2-pyrimidinyl. The term halo means fluoro, chloro, or bromo.

The following examples further illustrate the best mode contemplated by the inventors for carrying out the invention.

EXAMPLE I

8-Chloro-6-(o-Chlorophenyl)-4-Methoxy-1-(p-Methoxyphenyl)-4H-s-Triazolo[4,3-a][1,4]Benzodiazepine 5-(p-Methoxyphenyl)tetrazole (2.90 g., 0.0165 mole) is dissolved in 33 ml. of pyridine, and 2,7-dichloro-5-(o-chlorophenyl)-3-methoxy-3H-1,4-benzodiazepine (3.54 g., 0.01 mole) is added all at once. The solution is stirred and the mixture brought to reflux. At reflux nitrogen is rapidly evolved, and heating is continued for two minutes after evolution stops. The solution is cooled and poured into 300 ml. of water. The mixture is filtered and the residue washed with water, giving a brown solid. The solid is recrystallized from ethyl acetate with charcoal, giving 1.30 g. of buff colored crystals, m.p. 238°–240°.

Analysis for: $C_{24}H_{18}Cl_2N_4O_2$
Calculated: C, 61.94; H, 3.89; N, 12.04; Cl, 15.24
Found: C, 61.80; H, 3.94; N, 12.15; Cl, 15.11.

EXAMPLE II

8-Chloro-6-(o-Chlorophenyl)-4-Methoxy-1-Methyl-4H-s-Triazolo[4,3-a][1,4]Benzodiazepine 5-Methyltetrazole (3.54 g., 0.0422 mole) is dissolved in 90 ml. of pyridine, and 2,7-dichloro-5-(o-chlorophenyl)-3-methoxy-3H-1,4-benzodiazepine (9.70 g., 0.0274 mole) is added all at once. The solution is stirred and the mixture is brought to reflux. At reflux nitrogen is rapidly evolved, and heating is continued for 3 minutes after nitrogen evolution stops. The solution is cooled and most of the pyridine is removed at 60° in vacuo. The residue is poured into 500 ml. water, and the mixture is filtered giving 8.65 g. of a tan solid. The solid is recrystallized from acetonitrile with charcoal, giving 3.10 g. of a pink solid, m.p. 250°–252°.

Analysis for: $C_{18}H_{14}Cl_2N_4O$
Calculated: C, 57.93; H, 3.78; N, 15.01; Cl, 19.00
Found: C, 57.90; H, 3.77; N, 15.26; Cl, 19.15.

The subject matter which the applicants regard as their invention is particularly pointed out and claimed as follows:

1. A process for the preparation of 8-chloro-6-(o-chlorophenyl)-4-methoxy-1-methyl-4H-s-triazolo[4,3-a][1,4]benzodiazepine which comprises warming 2,7-dichloro-5-(o-chlorophenyl)-3-methoxy-3H-1,4-benzodiazepine with 5-methyl tetrazole in the presence of a hydrogen halide absorber.

* * * * *